(12) United States Patent
Sandoval (10) Patent No.: US 11,017,432 B2
(45) Date of Patent: May 25, 2021

(54) MARKET EXCHANGE FOR USER DATA AND REWARDS

(71) Applicant: Comcast Cable Communications, LLC, Philadelphia, PA (US)

(72) Inventor: Francis R Sandoval, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 604 days.

(21) Appl. No.: 13/834,499

(22) Filed: Mar. 15, 2013

(65) Prior Publication Data
US 2014/0278991 A1    Sep. 18, 2014

(51) Int. Cl.
*G06Q 30/02* (2012.01)
*G06Q 40/02* (2012.01)

(52) U.S. Cl.
CPC ......... *G06Q 30/0257* (2013.01); *G06Q 40/02* (2013.01)

(58) Field of Classification Search
CPC ............................ G06Q 30/0257; G06Q 40/02
USPC ............................................. 705/14.55, 14.39
See application file for complete search history.

(56) References Cited

U.S. PATENT DOCUMENTS

| | | | | |
|---|---|---|---|---|
| 6,061,660 A * | 5/2000 | Eggleston | ............... | G06Q 30/02 705/14.12 |
| 8,635,087 B1 * | 1/2014 | Igoe | ..................... | H04L 67/104 705/2 |
| 2002/0019769 A1 * | 2/2002 | Barritz | ............... | G06Q 30/0235 705/14.35 |
| 2002/0082910 A1 * | 6/2002 | Kontogouris | ........ | H04N 21/812 705/14.19 |
| 2004/0088219 A1 * | 5/2004 | Sanders | ............. | G06Q 30/0213 705/14.15 |
| 2004/0267611 A1 * | 12/2004 | Hoerenz | ............ | G06Q 30/0211 705/14.13 |
| 2005/0003806 A1 * | 1/2005 | Bazin | ...................... | H04W 4/02 455/414.2 |
| 2006/0085443 A1 * | 4/2006 | Pae | ..................... | G06F 21/6245 |
| 2007/0055986 A1 * | 3/2007 | Gilley | ................ | G06Q 30/0254 725/34 |
| 2007/0088603 A1 * | 4/2007 | Jouppi | .................. | H04L 67/306 705/14.66 |
| 2008/0000964 A1 * | 1/2008 | Flake | ..................... | G06Q 30/00 235/380 |
| 2009/0192863 A1 * | 7/2009 | Macaluso | ............ | G06Q 20/105 705/75 |
| 2009/0254971 A1 * | 10/2009 | Herz | .................. | G06Q 30/0603 726/1 |
| 2011/0106610 A1 * | 5/2011 | Landis | ............... | G06Q 30/0255 705/14.39 |
| 2011/0161172 A1 * | 6/2011 | Lee | ..................... | G06Q 30/0257 705/14.55 |
| 2011/0202881 A1 * | 8/2011 | Singh | ................. | G06Q 30/0236 715/833 |

(Continued)

*Primary Examiner* — David J Stoltenberg
*Assistant Examiner* — Robert C Johnson
(74) *Attorney, Agent, or Firm* — Ballard Spahr LLP (57) ABSTRACT

Methods and systems for data access are disclosed. An example method can comprise receiving a request to access user data. In one aspect, the request can comprise an offer, and the request and the offer can be provided to one or more users. The users can be associated with the user data. The users may grant or deny access to the requested user data in response to the request and in consideration of the offer.

20 Claims, 6 Drawing Sheets

(56) References Cited

U.S. PATENT DOCUMENTS

2011/0295719 A1* 12/2011 Chen .................. G06Q 50/01
                                                    705/27.1
2012/0226562 A1*  9/2012 Baum ................. G06Q 30/02
                                                    705/14.66

* cited by examiner

MARKET EXCHANGE FOR USER DATA AND REWARDS

BACKGROUND

As the amount of available content continues to increase, content users and providers may find it difficult to identify content relevant to the consumers. To help identify relevant content, content providers can collect a history of interactions, but such collection may be limited by various factors. There remains a need for more sophisticated methods and systems for management and access of user data.

SUMMARY

It is to be understood that both the following general description and the following detailed description are exemplary and explanatory only and are not restrictive, as claimed. Provided are methods and systems for data access. In an example method, a request to access user data can be received. The request can relate to any communication to a user, such as an advertisement or an offer, e.g., a reward offer. The request and the offer can be provided to one or more users. The users can be associated with the user data. A command can be received from one or more users granting or denying access to the requested user data in response to the request and the offer.

In another example method, user data associated with a user can be received (e.g., at a user device, set top box, network device, content device) and a request to access the user data can be provided. In one aspect, the request can comprise an offer. Any type of compensation or consideration may be attached to the request for user data. A command granting or denying access to the user data can be received in response to the request and the offer. In another example method, access to user data associated with one or more users can be requested. In one aspect, requesting access can comprise providing an offer. User data associated with one or more users can be received, for example, after the user granted access to the user data in response to the request and offer. Content can be selected based on the user data associated with the user.

In another example method, a data exchange can be provided. For example, the data exchange can be provided by a content provider. The content provider can receive and/or collect user data from users. The user can access content from the content provider or otherwise provide information to the content provide, thereby creating user data. In one aspect, the data exchange can allow communication between users and third parties who desire user data.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As a general overview, a content provider can collect user data. For example, the user data can comprise a history of channels and/or content programs viewed or recorded. The user data can comprise a history of interactions with a content interface, content guide, or other similar interface. The user data can comprise user preferences and other similar data. The content provider can collect this user data because of the unique relationship the content provider has to the user through providing a content delivery service (e.g., cable television, video on demand, digital video recording, and the like) and/or providing hardware interfaces (e.g., set-top box) to one or more users. The content provider can receive a request for the user data from a third party. In some aspects, the request can comprise an offer for users opting to provide access to their data. The request can relate to any communication to a user, such as an advertisement or an offer. Any type of compensation or consideration may be attached to the request for user data. The content provider can provide an interface allowing users to grant permission for the content provider to share data with the requestor. For example, requestors can comprise affiliates, merchants, marketers, advertisers, or other third parties. In exchange for access to the data, users can redeem the offer. The shared user data can be used to select content to provide to the user or otherwise personalize a user experience (e.g., extend a product offer or discount).

Figure 1:
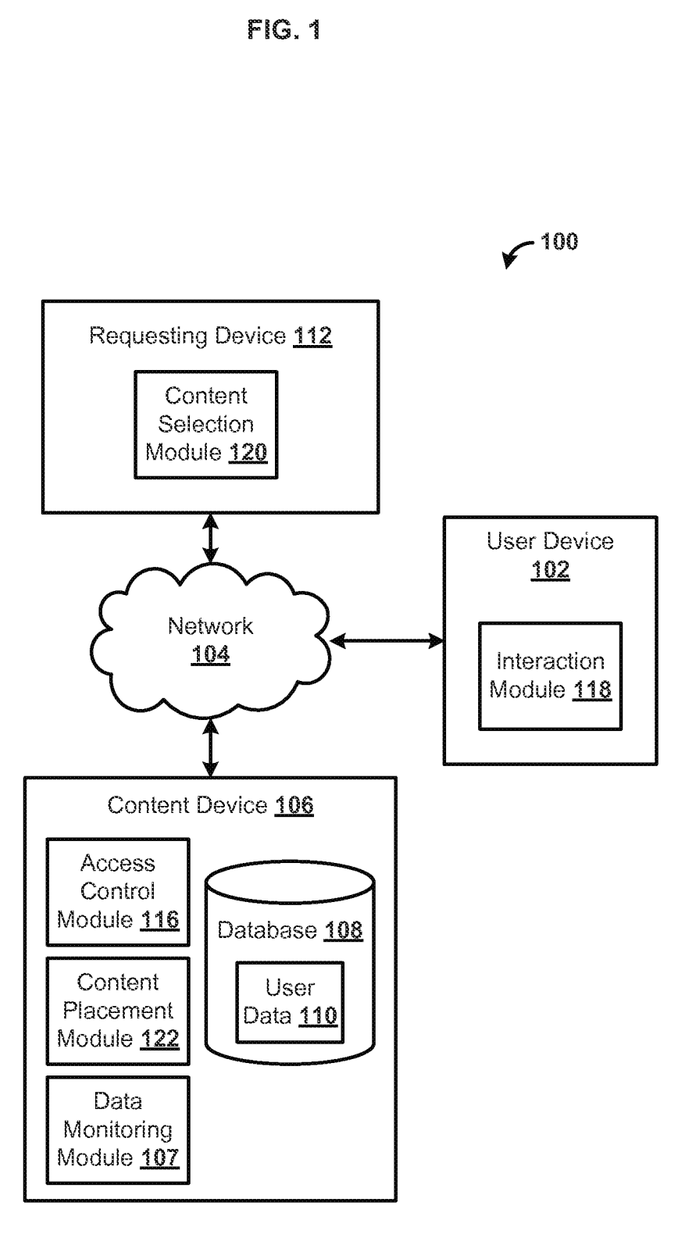
FIG. 1 is a block diagram illustrating various aspects of an example system in which the present methods and systems can operate.

FIG. 1 is a block diagram illustrating various aspects of an example system 100 in which the present methods and systems can operate. The present disclosure relates to the management of user data. Those skilled in the art will appreciate that present methods may be used in systems that employ both digital and analog equipment. One skilled in the art will appreciate that provided herein is a functional description and that the respective functions can be performed by software, hardware, or a combination of software and hardware.

In one aspect, the system 100 can comprise a user device 102 configured to provide data, such as content, to one or more users. Content can comprise video, audio, text, interactive content (e.g., content that provides a product offer), and the like. For example, the user device 102 can comprise a cable box, set-top box, digital to analog receiver, digital video recorder, computer workstation, laptop device, tablet device, mobile device, smartphone, television, digital streaming device, home communications terminal, and the like.

In one aspect, the user device 102 can receive content through a network 104. The network 104 can comprise a packet switched network, a circuit switched network (e.g., public switched telephone network), and or the like. The network 104 can comprise network adapters, switches, routers, and the like connected through wireless links (e.g., radio frequency, satellite) or physical links (e.g., fiber optic cable, coaxial cable, Ethernet cable). In one aspect, the network 104 can be configured to provide communication from telephone, cellular, modem, and/or other electronic devices to and throughout the system 100. The network 104 can comprise a content distribution network. The content distribution network can comprise a quadrature amplitude modulation based network and/or an internet protocol based network to deliver content to one or more user devices 102.

In one aspect, the system 100 can comprise a content device 106 configured to provide data, such as content, to one or more user devices 102. The content device 106 can comprise a data monitoring module 107 configured to collect user data from the user devices 102. Information, such as user data, can be stored locally to the user device 102 or remotely, for example on a network storage medium. For example, one or more user devices 102 can store information (e.g., user data) such as content viewing history, geographic location, user account information, language preferences, and the like. The information can relate the user's interaction with a variety of content sources, such as content channels, social media networks, electronic feeds, web pages, and the like. The information for a particular user can be collected from more than one user device 102. User data can also be collected from elements of the network 104 and/or the content device 106, such as the content placement module 122. For example, content provided to users can be regulated by video streaming servers external to the user device 102.

In one aspect, the video stream services can be directly monitored by the data monitoring module 107. The data monitoring module 107 can also collect other information that can be generated and collected at user devices 102 that may be used for other purposes than providing content to the user. For example, a user may go to a web portal hosted by a content provider or service provider to enter in preferences and other personalization data.

In one aspect, the data monitoring module 107 can collect information from the content device 106. For example, the data monitoring module 107 can collect server-side information comprising a history of communications (e.g., requests for content, interactions with software, updating user preferences, and the like) with the user device 102. The communications can be received from a variety of hardware and software, such as an application on a smartphone, set-top box, television, or other computing device. Information can be stored at the content device 106 in addition to or instead of storing on the user device 102.

In one aspect, the user device 102 can automatically provide the information to the content device 106 as user data 110. In another aspect, the content device 106 can request the information from the user device 102. The information can be provided to the content device 106 at scheduled times or in near real time as the data is collected. In another aspect, information can be collected each time the user device 102 interacts with the content device 106. The data monitoring module 107 can store the collected user data 110 in a database 108. The database 108 can be located, for example, at the content device 106 or other location in the network 104.

In one aspect, the system 100 can comprise a requesting device 112. In one aspect, the requesting device 112 can be a third party computing device communicatively coupled to the content device 106 through the network 104. The third party computing device can be a computing device associated with the requestor or with an intermediary between the requestor and a content provider. In another aspect, the requesting device 112 can be implemented as software hosted on the content device 106 or other device managed by the content provider. The software hosted on the content device 106 can be configured to allow a requestor to navigate to an interface for requesting user data. The requesting device 112 can provide one or more requests for user data 110. The requests can each comprise an offer (e.g., reward offer). For example, the offer can offer goods and/or services in exchange for the user granting access to user data 110 associated with the user. The requesting device 112 can provide a request to the content device 106.

In one aspect, the content device 106 can comprise an access control module 116. The access control module 116 can process the request from the requesting device 112. For example, the access control module 116 can determine if the request and/or offer meets criteria or preset parameters such as threshold values. As an illustration, a content provider, service provider, or a user can establish criteria for specific types and amounts of user data. The criteria, such as threshold values, can be established with a specific number of units in a specific currency as a means to simplify the user experience. For example, one month's Video-on-Demand viewing history can be valued at X award points, while one month's linear video viewing history may be valued at 3X. Any value can be assigned to any data, data type, request, classification, or the like. In another aspect, when a request for user data, having an offer associated therewith, is received, the request for user data can be evaluated based on a number of award points associated with the requested user data. For example, if the offer associated with request is worth the same or more than the award points associated with the requested user data, then the offer can be extended to a user. As a further example, the user can receive the offer and decide whether to grant or deny the request for the user data. If the user grants the request, the offer can be redeemed by the user.

As an illustrative example, a requestor (e.g., third-party) may request access to a user's viewing history for the past 3 months. In exchange for the requested information, the requestor may offer the user an offer having a redeemable value of $20.00. Accordingly, if the offer (e.g., $20.00) is the same or more than the award points assigned to 3 months of viewing history, then the offer can be presented to the user. If the offer is below the value (e.g., award points) assigned to 3 months of viewing history, then the offer is not presented to the user and the request may be denied.

In one aspect, the access control module 116 can determine which of the plurality of users (e.g., a select user) receives the request and offer. For example, the access control module 116 can determine an account preference associated with a user. As a further example, the account preference can indicate a user's preference for receiving requests and/or offers. For example, in one implementation, a user can set the threshold values associated with specified user data. Accordingly, the access control module 116 can evaluate requests based on user preferences. For example, a user may indicate that no offer should be extended or only offers valued above the threshold value. The access control module 116 can provide the request and/or offer to one or more user devices 102.

In one aspect, the access control module 116 can allow users to manage the user's associated user data 110. For example, the access control module 116 can provide a user interface for the users to manage associated user data 110. As another example, the user device 102 can comprise an interaction module 118 configured to provide one or more users a user interface for controlling access to the user's respective associated user data 110. The user interface provided by the access control module 116 and/or interaction module 118 can provide the request to a user at the user device 102. The user interface can also provide the offer to the user at the user device 102. The user interface can allow the user to grant or deny the request from the requesting device 112. Additionally, the user interface can allow the user at the user device 102 to further mange the user's account settings. For example, the user can set account preferences indicating thresholds for user data requests and offers. For example, the account preferences can specify specific vendors (e.g., advertising companies), specific types of offers (e.g., types of goods or services), minimum monetary amounts, and the like. As a further example, criteria or parameters, such as thresholds, based on the account preferences can comprise specific venders, types of vendors, types of offers, monetary amounts, and the like. For example, the criteria can specify that only vendors that sell a particular kind of product (e.g., cars, magazines, health products, kitchen products, and the like) can have associated offers extended to users. Types of offers can comprise, for example, a monetary offer, product offer, discount award, and the like. Users can set a preference to block or otherwise limit requests for certain user data. Thus, preferences or criteria can specify the type of user data associated with the request. For example, a preference can specify that all offers requesting personally identifiable information are denied (e.g., not extended to a user).

In another aspect, users can set preferences limiting what kind of parties can provide the request. For example, requests can come from third parties (e.g., affiliate X offers Y in exchange for Z) and/or from a service provider or content provider (e.g., the content provider or service provider offers award points for data sharing, which points can be redeemed with the content provider or third parties). Thus, preferences can specify specific third parties, content providers, and/or service providers that can provide the offer. Users can also set rules for accepting offers, rather than explicitly accepting offers individually. For example, a rule might be "only present offers valued at or above X," or alternatively, "accept all offers valued at or above value Y." For example, the rule might be "only present offers valued at or above $20" or "accept all offers valued at or above $25." In one aspect, X and Y can vary from $0 to $100 or some other limiting amount. It should be noted, however, that a variety of values can be used for X, Y, and Z.

The access control module 116 can receive an instruction from the user device 102 indicating the user's granting or denial of permission to share the user's data 110. The access control module 116 can process the instruction. For example, if the request is granted by the user, the access control module 116 can store data indicating that the user can redeem the offer associated with the request. Additionally, the access control module 116 can provide the user data 110 of the user who granted the request to the requesting device 112. As another example, if the request is denied by the user, the access control module 116 can store data indicating that the user denied the request.

In one aspect, the requesting device 112 can comprise a content selection module 120 configured to identify content to provide to a user granting the request. For example, the content selection module 120 can identify an advertisement, television show, movie, music, or other content based on the user data of the user granting the request. The content selection module 120 can also identify interactive content, such as native applications, web content, URLs, or other resource used by a user device 102 to provide an interactive offer to a user. For example, the result of a user accepting a request might be the opportunity for a user to request information on a product, purchase a product (perhaps at discount), register for a contest, or any other sort of interactive content experience. In one aspect, the content identified by the content selection module 120 can be located at the requesting device 112. The requesting device 112 can provide the content to the user device 102 directly or indirectly (e.g., by providing the content to the content device 106 to provide to the user device 102). In another aspect, the content selection module 120 can identify content located at the content device 106. Accordingly, the content device 106 can provide the selected content to the user device 102.

In one aspect, the content selection module 120 can indicate to the content device 106 one or more times and/or scenarios in which to provide the content to the user device 102. In another aspect, the content device 106 can comprise a content placement module 122 configured to determine one or more times and/or scenarios in which to provide the content to the user device 102. For example, if the content is an advertisement, the requesting device 112 and/or content placement module 122 of the content device 106 can determine to provide the advertisement to the user device 102 during a specified show, movie, or music. The content device 106 can provide the selected content on a specific day, over a specific time period, for a given number of presentations, or the like.

In summary, in an example embodiment, the methods and systems disclosed can be located within one or more content device 106, user device 102, and/or requesting device 112. For example, the methods can be implemented through the access control module 116, content placement module 122, and/or interaction module 118.

Figure 2:
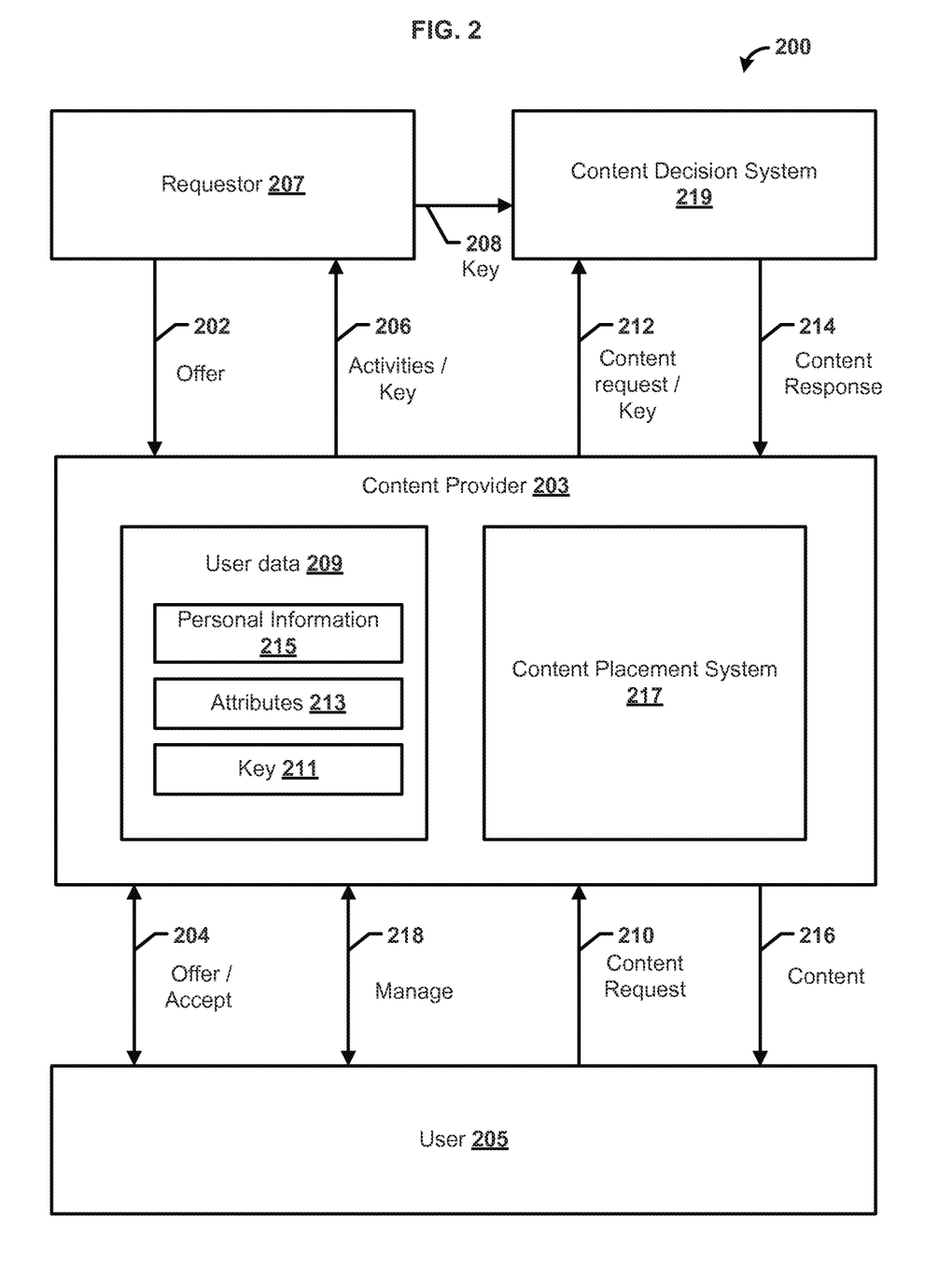
FIG. 2 is a block diagram illustrating an example method and system for data access.

FIG. 2 is a block diagram illustrating an example operating environment 200 for data access. In one aspect, the operating environment 200 and/or the system 100 of FIG. 1 can be configured as a data exchange. For example, the data exchange can be provided by a content provider. The content provider can receive and/or collect user data from users. The users can access content from the content provider or otherwise provide information to the content provider, thereby creating user data. In one aspect, the data exchange can allow communication between users and third parties who desire user data. For example, the data exchange can be configured to allow a third party and/or the content provider to request information, such as user data from the users. The third parties and/or content provider can provide offers in exchange for the user data.

In one aspect, the operating environment 200 can comprise a user data escrow service or a market exchange configured to provide users 205 the ability to allow user data 209 to be provided to requestors 207 of the user data 209 in exchange for products and services. The operating environment 200 can benefit requestors 207 of the user data 209 because the operating environment 200 can allow requestors 207 to access otherwise inaccessible data. The operating environment 200 can be beneficial to content providers 203 because the operating environment 200 can lead to higher cost per mille (CPM) for advertisements and new revenue streams. Additionally, the operating environment 200 can be beneficial for users 205 who consume content because the users 205 can benefit from the data that is generated by the users' 205 activities.

In one aspect, the example operating environment 200 can comprise a data source, such as content provider 203. The content provider 203 can allow users 205 to select (e.g., opt-in to) data management services. The content provider 203 can then receive orders from requestors 207 to provide offers (e.g., discounts, products, services) to users 205 who access content services in return for records of the users' activities (e.g., user data). The content provider 203 can provide offers to users 205 on behalf of the requestors. When a user 205 accepts an offer, user data 209 can be shared with the requestor. In an incentive to share user data 209, the content provider 203 can offer a user 205 goods or services. The goods and/or services can be provided by the requestor 207 or other third parties. In one aspect, the content provider 203 can offer goods and/or services from the content provider's 203 own catalog. The following can comprise an example request and offer: 'Sign up for our data management service and receive discounts from X number of affiliates. Our service protects your privacy while delivering only the most relevant content to you. Win Y number of award points, Z number of free video on demand (VOD) movies, or select a gift from one of our participating affiliates to get started." For example, the user can be offered discounts from 100 affiliates to win 1000 award points, and 2 free VOD movies. In one aspect, X can vary from 1 to 1,000, Y can vary from 1 to 10,000, and Z can vary from 1 to 20, but other limiting amounts can be used for X, Y, and Z. It should be noted that a variety of values can be used for X, Y, and Z.

In one aspect, a user 205 can pre-register for the service as described herein or effectively become registered at the time an offer is presented and accepted. In one aspect, the content provider 203 can protect user data 209 by monitoring the activities of the requestor 207. For example, the content provider 203 can enforce terms and conditions on the usage of the user data 209 by requestor 207. The content provider 203 can verify that the requestor 207 is complying with the terms and conditions. In one aspect, terms and conditions can constrain the types of offers made available to users 205 in order to prevent offers that do not meet certain preferences or criteria for rewarding users 205 for participation.

In one aspect, user data 209 shared with a requestor 207 can be stored by or accessible to the requestor 207 for a limited period of time. For example, the user data 209 can be stored by or accessible to the requestor 207 during the context of a content campaign (e.g., advertisement campaign) or some other time period (e.g., several days, weeks, months). In another aspect, users 205 can have visibility and control over how the user's data 209 is shared. For example, the user 205 can be notified of how, when, and to what requestor the user data is shared. Additionally, users 205 can limit the use of user data 209 by any party, including the content provider 203.

In another aspect, when a user 205 accepts an offer, a unique key 211 can be generated on behalf of the user 205. This key 211, along with user data 209 can be provided to the requestor 207. In one aspect, the user data 209 can comprise attributes 213 of the user 205, such as content viewing history or other information valued by requestors 207. In one aspect, the content provider 203 can choose to exclude personal information 215 (e.g., personally identifiable information) in the user data 209 to preserve anonymity of the user 205.

In one aspect, the operating environment 200 can be used as part of a content campaign that is associated with the user keys 211 to identify a market segment. A content campaign can be an advertising campaign or other content delivery plan. For example, when requests for content are generated on behalf of the user 205, a key 211 in the request can be used by the content provider 203 and/or user device as part of selecting and providing content (e.g., advertisement) for the user 205.

In one aspect, the content provider 203 can provide one or more content channels. One or more of the content channels can be provided to the content provider 203 by a requestor 207. For instance, an offer may come from a requestor 207 that provides one or more channels. If the offer is accepted by a user 205, user data 209 can be shared with the requestor 207 that provides one or more channels. The requestor 207 that provides one or more channels can then utilize the user data 209 in working with advertisers or other content sources associated with the requestor 207 that provides one or more channels. Accordingly, the requestor 207 that provides one or more channels can provide additional content, such as an advertisement, rather than the content provider 203.

There are several benefits provided by the example operating environment 200. For example, providing control of a user's data 209 to the user 205 can encourage much greater usage of the data 209. While the content provider 203 may be limited by laws, contracts, social norms, and the like in what the content provider 203 can do to utilize user data 209, a user 205 can find value in sharing the user data 205. By allowing the user 205 to find value in the user data 209, offer acceptance rates for sharing user data 209 are potentially much greater than the acceptance rates would be otherwise.

In one aspect, FIG. 2 also illustrates an example method for data access that can be accomplished with the example operating environment 200. At step 202, a requestor 207 (e.g., affiliated, marketer, advertiser) can provide a request and offer (e.g., reward offer) to a content provider 203 (e.g., a cable TV operator) to be presented to one or more users 205 (e.g., the content provider's customers). The offer can be made through an interactive application on a user device (e.g., set-top box, computing device, mobile device) or otherwise. In one aspect, the offer 202 can contain an incentive and/or reward to the user 205. As a precursor, a content provider 203 can offer the users 205 the opportunity to participate in the data escrow service. At step 204, an offer can be presented to a user 205 on behalf of a requestor 207. The user 205 can accept or decline the offer. At step 206, on acceptance of the offer, the content provider 203 can generate a unique key 211. The unique key 211 can be associated with a usage policy (e.g., good for one X number of days). The key 211 and an agreed upon subset of attributes 213 can be shared with the requestor 207. At step 208, the requestor 207 can utilize the user data 209 to create campaigns (e.g., advertisement campaigns) that associate content (e.g., advertisements) to user keys 211 and the associated user data attributes 213.

At step 210, a content request (e.g., advertisement request) can be generated on behalf of a user 205. At step 212, when a content request is generated on behalf of a user 205, the content provider 203 can provide the user's key 211 as part of the content request 212 to a content decision system 219. The content decision system 219 can comprise, for example, the content selection module 120 of FIG. 1. The content decision system 219 can be an internal component of the content provider 203 or part of an external system. At step 214, after receiving the content request, the content decision system 219 can find content campaigns that are associated with the user key 211 or otherwise identify and select the most appropriate content. At step 216, the selected content can be provided to the user 205 based on the user data 209. For example, the content provider 203 can maintain a content placement system 217. The content placement system 217 can comprise, for example, the content placement module 122 of FIG. 1. The content placement system 217 can provide the selected content to the user 205. At step 218, users 205 can manage (e.g., view, edit, opt-out, and otherwise control) the user data 209 via online, TV, mobile, or other electronic interfaces, through customer care representatives, or through any other means supported by a content provider 203.

Figure 3:
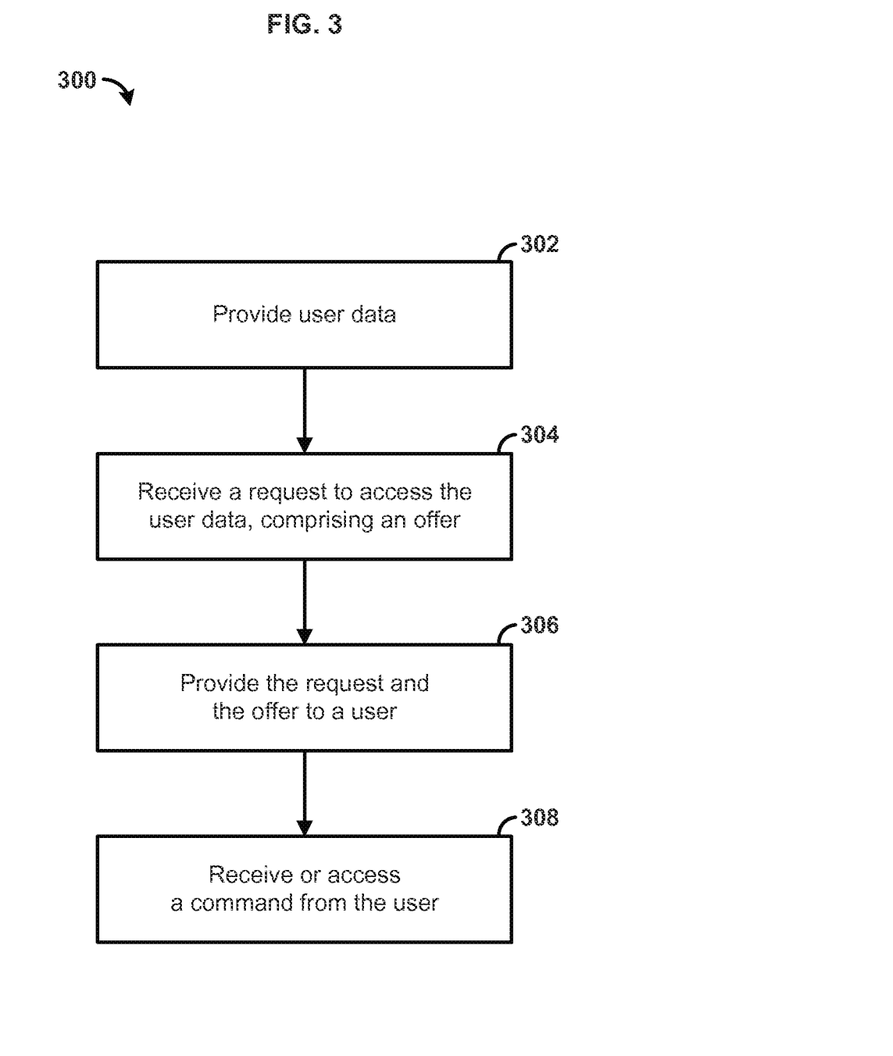
FIG. 3 is a flowchart illustrating an example method for data access.

FIG. 3 is a flowchart illustrating an example method 300 for data access. In step 302, user data can be provided. For example, a database comprising user data can be acquired or provided. The user data can be associated with one or more users. As a further example, an access control module can be provided to one or more users and/or devices. The access control module can facilitate control of access to user data associated. An application, e.g., running on a smartphone, can also be provided for control and access, and other functionalities. In one aspect, user data can comprise at least one of a user location, viewing history, demographic data, brand preferences, market segment, purchasing history (e.g., content purchasing data, home mortgage data, credit card data, car loan status data), content consumption data, and/or many other types of data including third party data.

In step 304, a request to access the user data can be received or accessed. The requests can be received or accessed from a requestor, such as an affiliate, marketer, or other third party. In one aspect, the request can comprise an offer, such as a reward offer. The offer can comprise an offer for money, credit, service, products, and the like. Any type of compensation or consideration may be attached to the request for user data. In one aspect providing the request and offer can comprise providing at least one of, an advertisement, a political poll, a market survey, or other interactive content. In one aspect, the offer can be redeemed from the requestor, the content provider, or another third party. For example, the content provider or another third party can provide an additional offer (e.g. reward) with the offer from the requestor. The additional offer and the offer from the requestor can be provided together, for example, by the content provider, requestor, or other third party. In exchange for viewing and/or interacting with the advertisement, political poll, market survey, or other interactive content, the user can be provided with the offer. Additionally, a requestor can be provided with market segment data for one or more users. For example, the user data can comprise market segment data. In one aspect, market segment data can comprise data associated with one or more market segments. Each market segment can be a group of consumers with a common interest or demographic. For example, market segment data can comprise information about geographic location, gender, age, race, and the like.

In step 306, the request and the offer can be provided to one or more users. For example, a determination can be made regarding which of the users receives the request and offer. In one aspect, the offer can be compared to criteria, such as preferences or thresholds. For example, a determination can be made regarding whether the offer meets or exceeds a threshold. As a further example, criteria can be based on a user preference, such as a type of offer, amount of the offer, type of user data requested, vendor providing the offer, type of party requesting the user data, and the like. The criteria can also be based on specifications set by the content provider or service provider, such as minimum values corresponding to types of user data request, technical specifications, legal specifications, and the like.

In step 308, a command can be received from the one or more of users. The command can grant or deny access to the requested user data (e.g., or a portion thereof) in response to the request and the offer. For example, access can be granted to the respective associated user data for a predetermined time period. The pre-determined time period can be a specified number of seconds, minutes, hours, days, weeks, months, and the like. The command can be received from a dialogue box or other interface configured to provide the offer to one or more users. For example, a dialogue box can be provided through software on a set top box or other device and/or software provided to one or more users. In one aspect, when more than one offer is provided, the one or more users can grant one or more of the offers and deny other offers. In one aspect, an offer that has been denied or ignored can be amended to increase, improve, or otherwise alter the offer. In another aspect, when the offer has been denied or ignored, the request can be amended to decrease or otherwise alter the request. For example, the user can provide feedback regarding the offer. As another example, the user can provide a counter offer, and the requestor and/or content provider can accept the counter offer.

Figure 4:
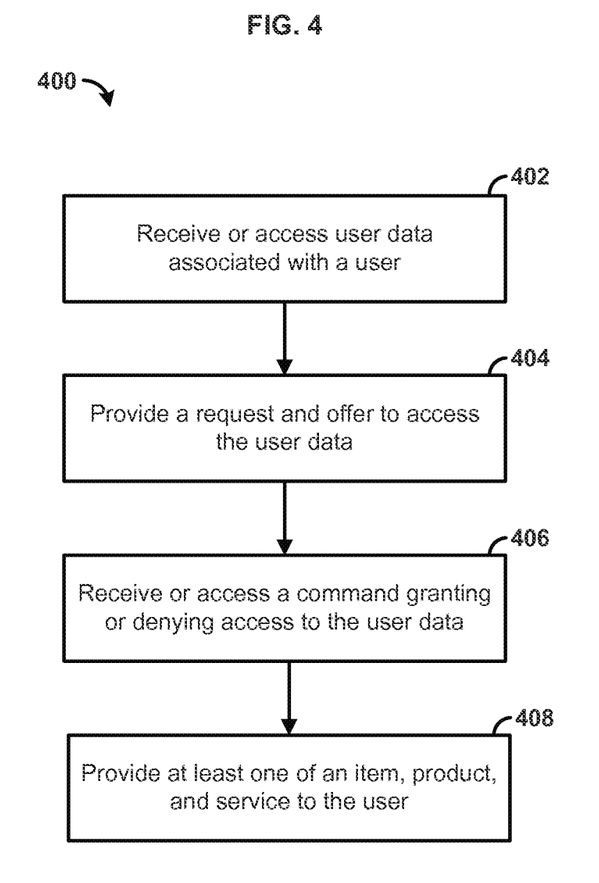
FIG. 4 is a flowchart illustrating another example method for data access.

FIG. 4 is a flowchart illustrating another example method 400 for data access. In one aspect, the method 400 can be performed by a user device, set top box, television, computer interface, content device, network device, intermediary device, and the like. In step 402, user data associated with a user can be accessed or received (e.g., received from another source, received and/or generated through interactions with a user). As an example, market segment data associated with the user can be received. In one aspect, the user data can comprise market segment data. In one aspect, market segment data can comprise data associated with one or more market segments. Each market segment can be a group of consumers with a common interest or demographic. For example, market segment data can comprise information about geographic location, gender, age, race, and the like. As another example, at least one of a user location, viewing history, demographic data, brand preferences, market segment, purchasing history (e.g., content purchasing data, home mortgage data, credit card data, car loan status data), and/or many other types of third party data can be received.

In step 404, a request to access the user data can be provided. In one aspect, the request can comprise an offer. The request can relate to any communication to a user, such as an advertisement or an offer. The offer can comprise an offer for money, credit, service, products, and the like. Any type of compensation or consideration may be attached to the request for user data. In one aspect, at least one of an advertisement, a political poll, a market survey, or other interactive content can be provided. In exchange for viewing and/or interacting with the advertisement, political poll, market survey, or other interactive content, the user can be provided with the offer. In one aspect, step 404 can comprise determining if the user can receive the request and the offer. For example, the offer can be compared to criteria, such as preferences or thresholds. As a further example, it can be determined if the offer meets or exceeds a threshold. The criteria can be based on a user preference or other parameters such as a type of offer, amount of the offer, type of user data requested, vendor providing the offer, type of party requesting the user data, and the like. The criteria can also be based on specifications set by the content provider or service provider, such as minimum offer values corresponding to types of user data request, technical specifications, legal specifications, and the like.

In step 406, a command granting or denying access to the user data can be received. The command can be received in response to the request and the offer. In one aspect, access can be granted to the user data for a predetermined time period. The pre-determined time period can be a specified number of seconds, minutes, hours, days, weeks, months, and the like. The command can be received from a dialogue box or other interface configured to provide the offer to one or more users. For example, a dialogue box can be provided through software on a set top box or other device and/or software provided to one or more users.

In step 408, at least one of an item, product, and service can be provided. The item, product, and/or service can be provided in exchange for the user granting the request for access of the user data. For example, a user can be provided access to a service, a coupon, a product, or the like. As another example, the item, product, and/or service can be delivered to a user. The delivery can be an electronic delivery (e.g., access to content or other service, electronic file delivery, reward points, coupon codes, and the like) or a physical delivery.

Figure 5:
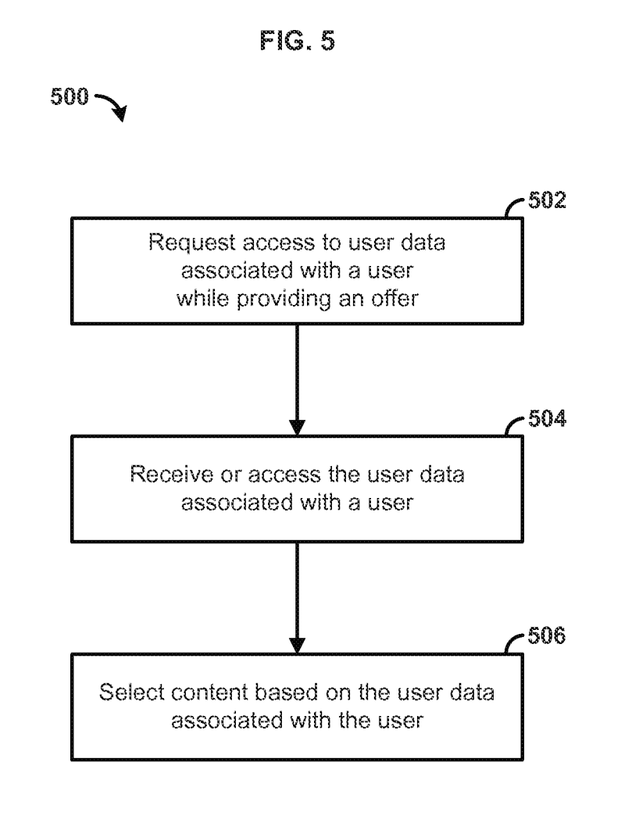
FIG. 5 is a flowchart illustrating yet another example method for data access.

FIG. 5 is a flowchart illustrating yet another example method 500 for data access. In step 502, access to user data associated with one or more users can be requested. In one aspect, user data can comprise at least one of a user location, viewing history, demographic data, brand preferences, market segment, purchasing history (e.g., content purchasing data, home mortgage data, credit card data, car loan status data), and/or many other types of third party data. In one aspect, requesting access can comprise providing an offer. The offer can comprise an offer for money, credit, service, products, and the like.

In one aspect, the request and the offer can be subject to a comparison of the offer to criteria, such as a preference or threshold. For example, the request and the offer can be subject to a determination on whether the offer meets or exceeds a threshold. The criteria can be based on a user preference, such as a type of offer, amount of offer, type of user data requested, vendor providing the offer, type of party requesting the user data, and the like. The criteria can also be based on specifications set by the content provider or service provider, such as minimum offer values corresponding to types of user data request, technical specifications, legal specifications, and the like.

In step 504, user data associated with one or more users can be received or accessed. For example, a user can grant access to the user data in response to the request and offer. Access to the user data associated with the user can be received for a predetermined time period. The pre-determined time period can be a specified number of seconds, minutes, hours, days, weeks, months, and the like. The command can be received from a dialogue box or other interface configured to provide the offer to one or more users. For example, a dialogue box can be provided through software on a set top box or other device and/or software provided to one or more users. Then, the command can be provided to the requestor.

In one aspect, market segment data for the user can be received. In one aspect, the user data can comprise market segment data. In one aspect, market segment data can comprise data associated with one or more market segments. Each market segment can be a group of consumers with a common interest or demographic. For example, market segment data can comprise information about geographic location, gender, age, race, and the like. In one aspect, at least one of a user location, viewing history, demographic data, brand preferences, market segment, purchasing history (e.g., content purchasing data, home mortgage data, credit card data, car loan status data), and/or many other types of third party data can be received or accessed.

In step 506, content can be selected based on the user data associated with the user. For example, an identifier (e.g., key value) for at least one of an advertisement, a political poll, a market survey, or other interactive content can be provided. In exchange for viewing and/or interacting with the advertisement, political poll, market survey, or other interactive content, the user can be provided with the offer. As a further example, the identifier can be associated with a vendor, advertising campaign, and/or a variety of other indicators that can identify content. Accordingly, when a user (e.g., or a user device) associated with an identifier requests content, such as an advertisement, at a later time, the request can comprise the identifier, and the identifier can be used to provide the selected content to the user.

Figure 6:
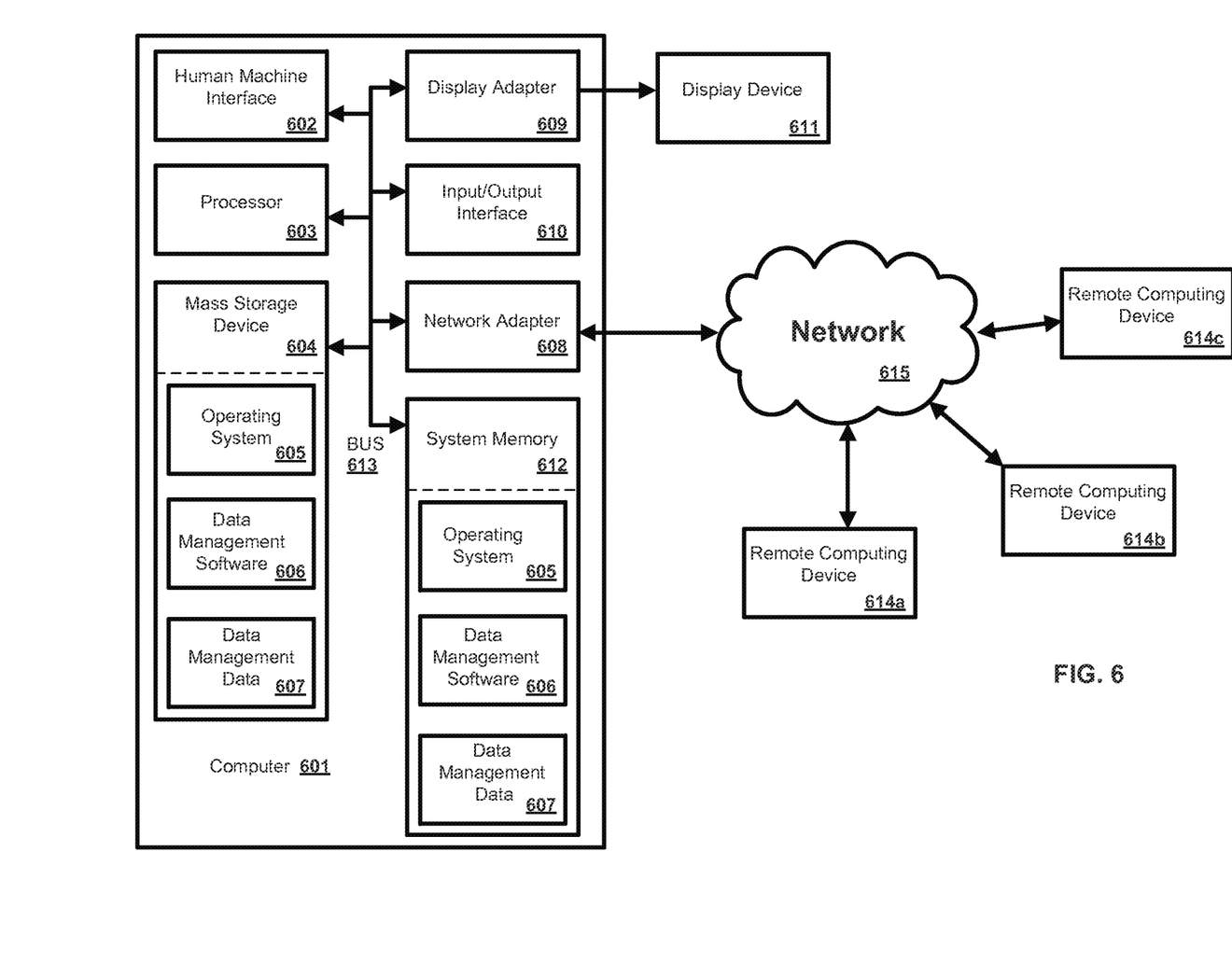
FIG. 6 is a block diagram illustrating an example computing device in which the present methods and systems can operate.

In an exemplary aspect, the methods and systems can be implemented on a computer 601 as illustrated in FIG. 6 and described below. By way of example, the content device 106 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, data management software 606, data management data 607, a network adapter 608, system memory 612, an Input/Output Interface 610, a display adapter 609, a display device 611, and a human machine interface 602, can be contained within one or more remote computing devices 614$a,b,c$ at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as data management data 607 and/or program modules such as operating system 605 and data management software 606 that are immediately accessible to and/or are presently operated on by the processing unit 603.

In another aspect, the computer 601 can also comprise other removable/non-removable, volatile/non-volatile computer storage media. By way of example, FIG. 6 illustrates a mass storage device 604 which can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and data management software 606. Each of the operating system 605 and data management software 606 (or some combination thereof) can comprise elements of the programming and the data management software 606. Data management data 607 can also be stored on the mass storage device 604. Data management data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of data management software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    receiving, from a network device, a request to access user data associated with usage of a content delivery service, wherein the request comprises an offer of redeemable value in exchange for access to at least a portion of the user data;
    requesting, from a user device based on the redeemable value and a user preference, access to at least a portion of user data associated with the user device in exchange for redemption of the offer, wherein the user preference indicates at least one of: a type of the user data or an amount of the user data;
    granting, based on a response from the user device indicating access to the at least the portion of the user data is to be granted, the network device access to the at least the portion of the user data; and
    sending, to the user device, data for redeeming the offer.

2. The method of claim 1, wherein the at least the portion of the user data comprises market segment data associated with the user device.

3. The method of claim 1, wherein granting the access to the at least the portion of the user data comprises granting the access for a predetermined time period.

4. The method of claim 1, wherein the user data comprises at least one of: a user location, a viewing history, demographic data, a brand preference, a market segment, and a purchasing history.

5. A method, comprising:
    receiving a request to access user data associated with a user device, wherein the request comprises an offer of redeemable value in exchange for access to the user data, wherein the user data is associated with usage of a content delivery service;
    sending, to the user device, based on the redeemable value and a user preference, the request to access the user data, wherein the user preference indicates at least one of: a type of the user data or an amount of the user data; and
    sending, to the user device, based on an indication that the request to access the user data is granted, data to receive at least one of: an item, a product, and a service.

6. The method of claim 5, further comprising storing the user data.

7. The method of claim 5, wherein the user data comprises market segment data associated with the user device.

8. The method of claim 5, wherein the indication that the request to access the user data is granted causes access to be granted to the user data for a predetermined time period.

9. The method of claim 5, further comprising sending to the user device, based on the indication that the request to access the user data is granted, at least one of: an advertisement, a political poll, and a market survey.

10. A method, comprising:
    sending, to a content delivery device, based on a user preference associated with one or more user devices, a request for access to user data associated with usage of a content delivery service by the one or more user devices, wherein the request comprises an offer of redeemable value in exchange for access to at least a portion of the user data, wherein the user preference indicates at least one of: a type of the user data or an amount of the user data;
    receiving, based on an indication that at least one user device of the one or more user devices accepted the offer, a portion of the user data associated with the at least one user device;
    determining, based on the portion of the user data associated with the at least one user device, content; and
    sending, to the content delivery device, the content and data for redeeming the offer.

11. The method of claim 10, wherein the portion of the user data associated with the at least one user device comprises market segment data.

12. The method of claim 10, wherein receiving the portion of the user data associated with the at least one user device comprises receiving access to the portion of the user data for a predetermined time period.

13. The method of claim 10, wherein receiving the portion of the user data associated with the at least one user device comprises receiving at least one of a user location, a viewing history, demographic data, brand preferences, a market segment, and a purchasing history.

14. The method of claim 10, wherein the content comprises at least one of: an advertisement, a political poll, and a market survey.

15. The method of claim 1, wherein the data for redeeming the offer comprises one or more instructions for receiving at least one of: an item, a product, and a service.

16. The method of claim 1, wherein the user preference further indicates a monetary amount.

17. The method of claim 5, wherein the user preference further indicates a monetary amount.

18. The method of claim 1, wherein the content delivery service comprises at least one of: a cable television service, a video-on-demand service, and a digital video recording service.

19. The method of claim 1, wherein the user device comprises at least one of: a mobile device, a set-top-box, and a computing device.

20. The method of claim 10, wherein sending the content and the data for redeeming the offer to the content delivery device causes the content delivery device to send the content and the data for redeeming the offer to the at least one user device.

* * * * *